United States Patent
Sugimoto

(10) Patent No.: US 12,205,352 B2
(45) Date of Patent: Jan. 21, 2025

(54) IMAGE IDENTIFYING APPARATUS, VIDEO REPRODUCING APPARATUS, IMAGE IDENTIFYING METHOD, AND RECORDING MEDIUM

(71) Applicant: Panasonic Intellectual Property Management Co., Ltd., Osaka (JP)

(72) Inventor: Takashi Sugimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/264,717

(22) PCT Filed: Feb. 16, 2022

(86) PCT No.: PCT/JP2022/006122
§ 371 (c)(1),
(2) Date: Aug. 8, 2023

(87) PCT Pub. No.: WO2022/181410
PCT Pub. Date: Sep. 1, 2022

(65) Prior Publication Data
US 2024/0112449 A1     Apr. 4, 2024

(30) Foreign Application Priority Data
Feb. 24, 2021   (JP) .................................. 2021-027910

(51) Int. Cl.
*G06V 10/77* (2022.01)
*G06T 5/60* (2024.01)
(Continued)

(52) U.S. Cl.
CPC .............. *G06V 10/774* (2022.01); *G06T 5/60* (2024.01); *G06V 10/267* (2022.01);
(Continued)

(58) Field of Classification Search
USPC .......................................................... 386/248
See application file for complete search history.

(56) References Cited

U.S. PATENT DOCUMENTS 7,636,450 B1 * 12/2009 Bourdev ............. G06F 16/5838
715/234
2004/0194141 A1    9/2004 Sanders
(Continued)

FOREIGN PATENT DOCUMENTS

| CN | 111131889 A | 5/2020 |
| JP | 2004-289848 A | 10/2004 |

(Continued)

OTHER PUBLICATIONS

International Search Report issued on May 10, 2022 in International Patent Application No. PCT/JP2022/006122, with English translation.

(Continued)

*Primary Examiner* — Nigar Chowdhury
(74) *Attorney, Agent, or Firm* — Rimon P.C.

(57) ABSTRACT

An image identifying apparatus includes: an obtainer that obtains image data; an image processor that generates test image data by performing resizing to reduce the image data with predetermined aspect ratio distortion; a storage unit that stores a machine learning model used to identify attribute information of the test image data; and an identifier that identifies the attribute information of the test image data, using the machine learning model. The machine learning model includes trained parameters that have been adjusted through machine learning using a training data set including items of second training image data obtained through application of one or more types of aspect ratio distortion including the predetermined aspect ratio distortion to each of items of first training image data, and items of attribute (Continued)

information associated with the items of second training image data.

10 Claims, 9 Drawing Sheets

(51) Int. Cl.
*G06V 10/26* (2022.01)
*G06V 10/774* (2022.01)
*G06V 10/776* (2022.01)
*G06V 20/40* (2022.01)

(52) U.S. Cl.
CPC .......... *G06V 10/273* (2022.01); *G06V 10/776* (2022.01); *G06V 20/46* (2022.01); *G06T 2207/10016* (2013.01); *G06T 2207/20081* (2013.01)

(56) References Cited

U.S. PATENT DOCUMENTS

| | | | |
|---|---|---|---|
| 2008/0177994 A1* | 7/2008 | Mayer | G06F 16/00 709/224 |
| 2010/0123822 A1* | 5/2010 | Wang | G06T 3/04 348/E7.003 |
| 2017/0345196 A1 | 11/2017 | Tanaka et al. | |

FOREIGN PATENT DOCUMENTS

| | | |
|---|---|---|
| JP | 2008-005177 A | 1/2008 |
| JP | 2011-221840 A | 11/2011 |
| JP | 2015-154303 A | 8/2015 |
| JP | 2016-143355 A | 8/2016 |
| JP | 2017-211939 A | 11/2017 |
| JP | 2020-024534 A | 2/2020 |

OTHER PUBLICATIONS

Ryuhei Sakurai, et al., "Correcting aspect ratio distortion of natural images by convolutional neural network", 2017 14th International Conference on Ubiquitous Robots and Ambient Intelligence (URAI), Jun. 2017, abstract.
Ryuhei Sakurai, et al., "Restoring Aspect Ratio Distortion of Natural Images With Convolutional Neural Network", IEEE Transactions on Industrial Informatics, vol. 15, No. 1, Jan. 2019, abstract.
Extended European Search Report dated Jul. 4, 2024 issued in the corresponding European Patent Application No. 22759449.6.
Anonymous: "Train Deep Learning Network to Classify New Images—MATLAB R2020b", Sep. 17, 2020 (Sep. 17, 2020), pp. 1-5, XP093176756&.
Anonymous: "Preprocess Images for Deep Learning—MATLAB R2020b", Sep. 17, 2020 (Sep. 17, 2020), pp. 1-3, XP093176757.
Sonck Victor: "Handling Sensitive Data on the Google Cloud Platform", Dec. 14, 2018 (Dec. 14, 2018), pp. 1-21, XP093177124.

\* cited by examiner

IMAGE IDENTIFYING APPARATUS, VIDEO REPRODUCING APPARATUS, IMAGE IDENTIFYING METHOD, AND RECORDING MEDIUM

CROSS-REFERENCE OF RELATED APPLICATIONS

This application is the U.S. National Phase under 35 U.S.C. § 371 of International Patent Application No. PCT/JP2022/006122, filed on Feb. 16, 2022, which in turn claims the benefit of Japanese Patent Application No. 2021-027910, filed on Feb. 24, 2021, the entire disclosures of which applications are incorporated by reference herein.

TECHNICAL FIELD

The present disclosure relates to an image identifying apparatus, a video reproducing apparatus, an image identifying method, and a recording medium.

BACKGROUND ART

Patent Literature (PTL) 1 discloses a generating apparatus that generates information used to appropriately recognize an image from information in a neural network.

CITATION LIST

Patent Literature

[PTL 1]
Japanese Unexamined Patent Application Publication No. 2017-211939

SUMMARY OF INVENTION

Technical Problem

The present disclosure provides an image identifying apparatus and the like capable of effectively identifying attribute information of an image.

Solution to Problem

An image identifying apparatus according to an aspect of the present disclosure includes: an obtainer that obtains image data; an image processor that generates test image data by performing resizing to reduce the image data with predetermined aspect ratio distortion; a storage unit that stores a machine learning model used to identify attribute information of the test image data; and an identifier that identifies the attribute information of the test image data, using the machine learning model. The machine learning model includes trained parameters that have been adjusted through machine learning using a training data set including items of second training image data obtained through application of one or more types of aspect ratio distortion including the predetermined aspect ratio distortion to each of items of first training image data, and items of attribute information associated with the items of second training image data. The image processor: (i) generates the test image data by performing mask processing on a region including a character in the image data obtained, and then performing the resizing on the image data that has been subjected to the mask processing, or (ii) if the image data obtained includes letterbox information, generates the test image data by erasing the letterbox information, and then performing the resizing on the image data that has been subjected to the erasing of the letterbox information.

A video reproducing apparatus according to an aspect of the present disclosure includes: an obtainer that obtains video data including items of image data and audio data and obtains, from the image identifying apparatus described above, attribute information as an identification result of each of the items of image data included in the video data; a setter that sets an image quality adjustment parameter used for image quality adjustment processing and sets an audio quality adjustment parameter used for audio quality adjustment processing, based on the attribute information identified in each of the items of image data; an image quality adjuster that performs an image quality adjustment on the image data according to the image quality adjustment parameter set by the setter; an audio quality adjuster that performs an audio quality adjustment on the audio data according to the audio quality adjustment parameter set by the setter; an image outputter that outputs the image data that has been subjected to the image quality adjustment; and an audio outputter that outputs the audio data that has been subjected to the audio quality adjustment. The image identifying apparatus includes: an image obtainer that obtains image data; an image processor that generates test image data by performing resizing to reduce the image data with predetermined aspect ratio distortion; a storage unit that stores a machine learning model used to identify attribute information of the test image data; and an identifier that identifies the attribute information of the test image data, using the machine learning model. The machine learning model includes trained parameters that have been adjusted through machine learning using a training data set including items of second training image data obtained through application of one or more types of aspect ratio distortion including the predetermined aspect ratio distortion to each of items of first training image data, and items of attribute information associated with the items of second training image data.

An image identifying method according to an aspect of the present disclosure includes: obtaining image data; performing image processing to generate test image data through resizing to reduce the image data with predetermined aspect ratio distortion; and identifying, using a machine learning model used to identify attribute information of the test image data, the attribute information of the test image data. The machine learning model includes trained parameters that have been adjusted through machine learning of a training data set including items of second training image data obtained through application of one or more types of aspect ratio distortion including the predetermined aspect ratio distortion to each of items of first training image data, and items of attribute information associated with the items of second training image data. The performing the image processing includes: (i) generating the test image data by performing mask processing on a region including a character in the image data obtained, and then performing the resizing on the image data that has been subjected to the mask processing, or (ii) if the image data obtained includes letterbox information, generating the test image data by erasing the letterbox information, and then performing the resizing on the image data that has been subjected to the erasing of the letterbox information.

Note that these general or specific aspects may each be implemented by an apparatus, an integrated circuit, a computer program, or a computer-readable non-transitory recording medium such as a CD-ROM or may each be implemented by any combination of an apparatus, an integrated circuit, a computer program, and a non-transitory recording medium.

Advantageous Effects of Invention

With image identification information or the like in the present disclosure, attribute information of an image can be effectively identified.

DESCRIPTION OF EMBODIMENTS

Figure 1:
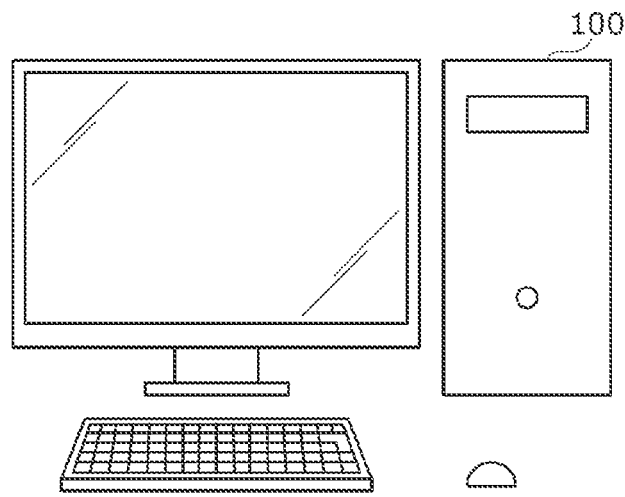
FIG. 1 is a diagram illustrating an example of an image identifying apparatus according to Embodiment 1.

Underlying Knowledge Forming Basis of the Present Disclosure

The present inventor has found that the following problems occur regarding the generating apparatus described in the section of Background Art.

In recent years, there has been a need to identify attribute information indicating what an image is about using a machine learning model. To generate such a machine learning model, a training data set including images used for training and attribute information items of those images is used. For example, PTL 1 discloses that processed images are generated, as images to be used for training, by cropping parts of generated composite images, corrected images that have been obtained by resizing the composite images, and corrected images that have been obtained by changing aspect ratios of the composite images.

According to the technology described in PTL 1, however, since an original image is cropped to generate a processed image, an area outside a region to be cropped in the original image is eliminated. Thus, such a processed image may not be suitable for generating a machine learning model used to identify what an entire image is about. For example, in an image including a display device on which video is displayed, if a display area of the display device is cropped, the entire image and the cropped image are different images. Thus, there is a risk of the occurrence of incorrect training. In a case where the entire original image before the cropping is an image of a news program, and the image shown on the display device in the program is a scene of a sport, for example, the original image is associated with the news program as correct answer data of attribute information. Thus, if the image portion shown on the display device is cropped and trained as the news image, the image of the scene of the sport is trained as the news image. Therefore, if an image of a sport scene is subjected to recognition processing using the generated machine learning model, a possibility that the image is falsely recognized as a news image becomes higher.

In view of the above, the present disclosure provides an image identifying apparatus and the like capable of effectively identifying attribute information of an entire image.

An image identifying apparatus according to an aspect of the present disclosure includes: an obtainer that obtains image data; an image processor that generates test image data by performing resizing to reduce the image data with predetermined aspect ratio distortion; a storage unit that stores a machine learning model used to identify attribute information of the test image data; and an identifier that identifies the attribute information of the test image data, using the machine learning model. The machine learning model includes trained parameters that have been adjusted through machine learning using a training data set including items of second training image data obtained through application of one or more types of aspect ratio distortion including the predetermined aspect ratio distortion to each of items of first training image data, and items of attribute information associated with the items of second training image data.

According to this, the machine learning model includes the trained parameters that have been adjusted through the machine learning of the training data set including: the items of second training image data obtained through the application of the one or more types of aspect ratio distortion including the predetermined aspect ratio distortion to be applied in the resizing to generate the test image data; and the items of attribute information associated with the items of second training image data. This enables the machine learning model to effectively identify the attribute information of the entire test image data. Moreover, since the test image is generated through the resizing for reduction, processing load related to such identification processing can be reduced.

For example, the image processor may generate the test image data by performing mask processing on a region including a character in the image data obtained, and then performing the resizing on the image data that has been subjected to the mask processing.

This can improve identification accuracy even when the image data includes such a character.

For example, if the image data obtained includes letterbox information, the image processor may generate the test image data by erasing the letterbox information, and then performing the resizing on the image data that has been subjected to the erasing of the letterbox information.

This can improve identification accuracy even when such letterbox information is included.

For example, the image processor may generate the test image data without performing clipping on an image of a main region of the image data.

According to this, since a part of the image of the main region is not eliminated, the attribute information of the entire image of the main region can be identified with high accuracy.

A video reproducing apparatus according to an aspect of the present disclosure includes: an obtainer that obtains video data including items of image data and audio data and obtains, from the image identifying apparatus described above, attribute information as an identification result of each of the items of image data included in the video data; a setter that sets an image quality adjustment parameter used for image quality adjustment processing and sets an audio quality adjustment parameter used for audio quality adjustment processing, based on the attribute information identified in each of the items of image data; an image quality adjuster that performs an image quality adjustment on the image data according to the image quality adjustment parameter set by the setter; an audio quality adjuster that performs an audio quality adjustment on the audio data according to the audio quality adjustment parameter set by the setter; an image outputter that outputs the image data that has been subjected to the image quality adjustment; and an audio outputter that outputs the audio data that has been subjected to the audio quality adjustment.

According to this, the image quality adjustment and the audio quality adjustment can be performed based on the attribute information identified from the obtained image data. Thus, the image quality adjustment and the audio quality adjustment can be performed suitably for characteristics of the image data and the audio data.

For example, the setter may set the image quality adjustment parameter and the audio quality adjustment parameter based on attribute information obtained at a predetermined time interval.

Thus, the image quality adjustment and the audio quality adjustment can be performed suitably for characteristics of the image data and the audio data at the predetermined time interval.

For example, the setter may set the image quality adjustment parameter and the audio quality adjustment parameter based on a type of attribute information that is most common among items of attribute information obtained in a predetermined period up to a present time.

According to this, even when image data that is more likely to be falsely recognized is included among the items of image data, the image quality adjustment parameter and the audio quality adjustment parameter are set based on the type of the attribute information most often identified. Thus, a possibility that the image quality adjustment parameter and the audio quality adjustment parameter are momentarily switched to those corresponding to a type of attribute information given by the false recognition can be reduced.

An image identifying method according to an aspect of the present disclosure includes: obtaining image data; performing image processing to generate test image data through resizing to reduce the image data with predetermined aspect ratio distortion; and identifying, using a machine learning model used to identify attribute information of the test image data, the attribute information of the test image data. The machine learning model includes trained parameters that have been adjusted through machine learning of a training data set including items of second training image data obtained through application of one or more types of aspect ratio distortion including the predetermined aspect ratio distortion to each of items of first training image data, and items of attribute information associated with the items of second training image data.

According to this, the machine learning model includes the trained parameters that have been adjusted through the machine learning of the training data set including: the items of second training image data obtained through the application of the one or more types of aspect ratio distortion including the predetermined aspect ratio distortion to be applied in the resizing to generate the test image data; and the items of attribute information associated with the items of second training image data. This enables the machine learning model to effectively identify the attribute information of the entire test image data. Moreover, since the test image is generated through the resizing, processing load related to such identification processing can be reduced.

A program according to an aspect of the present disclosure is a program for causing a computer to execute an image identifying method including: obtaining image data; performing image processing to generate test image data through resizing to reduce the image data with predetermined aspect ratio distortion; and identifying, using a machine learning model used to identify attribute information of the test image data, the attribute information of the test image data, in which the machine learning model includes trained parameters that have been adjusted through machine learning of a training data set including items of second training image data obtained through application of one or more types of aspect ratio distortion including the predetermined aspect ratio distortion to each of items of first training image data, and items of attribute information associated with the items of second training image data.

According to this, the machine learning model includes the trained parameters that have been adjusted through the machine learning of the training data set including: the items of second training image data obtained through the application of the one or more types of aspect ratio distortion including the predetermined aspect ratio distortion to be applied in the resizing to generate the test image data; and the items of attribute information associated with the items of second training image data. This enables the machine learning model to effectively identify the attribute information of the entire test image data. Moreover, since the test image is generated through the resizing, processing load related to such identification processing can be reduced.

Note that these general or specific aspects may each be implemented by an apparatus, an integrated circuit, a computer program, or a computer-readable non-transitory recording medium such as a CD-ROM or may each be implemented by any combination of an apparatus, an integrated circuit, a computer program, and a non-transitory recording medium.

Embodiments will be described below in detail with reference to the drawings as appropriate. Note however that description more detailed than necessary may be omitted. For example, detailed description for already well-known matters or duplicate description for substantially the same configuration may be omitted. This is to avoid the following description from becoming unnecessarily verbose and to facilitate the understanding of those skilled in the art.

The inventor provides the accompanying drawings and the following description so that those skilled in the art can fully understand the present disclosure. Such provision is not intended to limit the subject matter described in the claims.

Embodiment 1

[1-1. Configuration]

FIG. 1 is a diagram illustrating an example of an image identifying apparatus according to Embodiment 1.

As shown in FIG. 1, image identifying apparatus 100 is, for example, a personal computer (PC). Image identifying apparatus 100 may be a server or any other information processing apparatus. Image identifying apparatus 100 identifies attribute information of an obtained image by performing image identification processing on the image. The attribute information of the image is, for example, about a genre of a scene shown on the image. Examples of such a genre may include landscapes, people, sports, foods, and night views. The image may also be a frame of a moving image, for example. In this case, the attribute information of the image is about a genre of the moving image. Examples of such a genre may include sports, music, talks, and movies.

Figure 2:
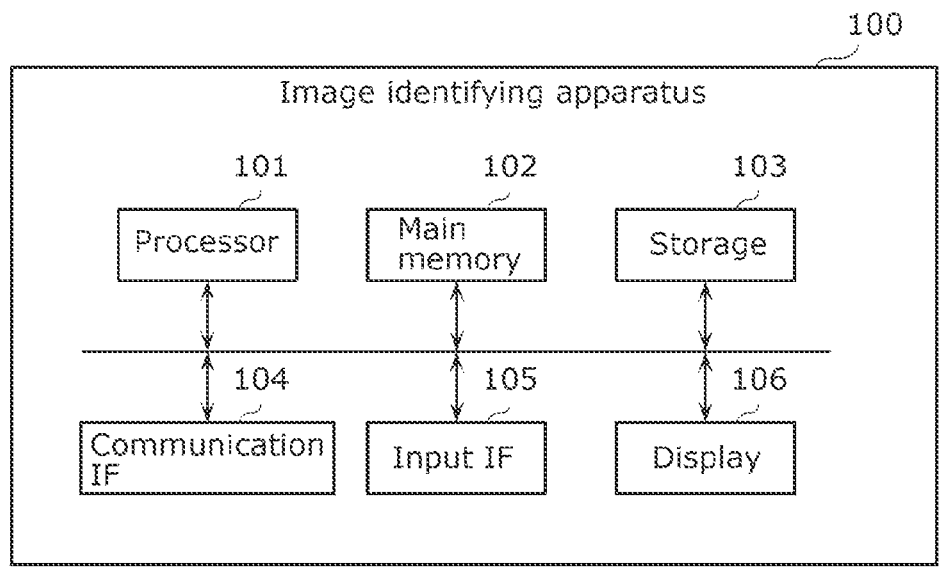
FIG. 2 is a block diagram illustrating an example of a hardware configuration of the image identifying apparatus according to Embodiment 1.

FIG. 2 is a block diagram illustrating an example of a hardware configuration of the image identifying apparatus according to Embodiment 1.

As shown in FIG. 2, image identifying apparatus 100 includes, as the hardware configuration, processor 101, main memory 102, storage 103, communication interface (IF) 104, input interface (IF) 105, and display 106.

Processor 101 is a processor that executes a program stored, for example, in storage 103.

Main memory 102 is a volatile storage area utilized as a work area used when processor 101 executes the program.

Storage 103 is a non-volatile storage area that holds various data such as programs.

Communication IF 104 is a communication interface for transmitting data to and from an external device such as a smartphone, a tablet, a personal computer (PC), or a server. Communication IF 104 may be an interface for wireless communication such as a wireless local area network (LAN) interface or a Bluetooth (registered trademark) interface, for example. Communication IF 104 may be an interface for wired communication such as a universal serial bus (USB) or a wired LAN interface. Note that communication IF 104 may be a communication interface for transmitting data to and from an external device via a communication network without being limited to the above. Communication IF 104 may also be a reader that reads, from a recording medium such as a memory card, data stored on the recording medium.

Input IF 105 is an interface for accepting an input from a person. Input IF 105 may be a pointing device such as a mouse, a touchpad, a touch screen, or a trackball, or a keyboard.

Display 106 is, for example, a liquid crystal display or an organic EL display.

Note that image identifying apparatus 100 may include no input IF 105 and no display 106.

Figure 3:
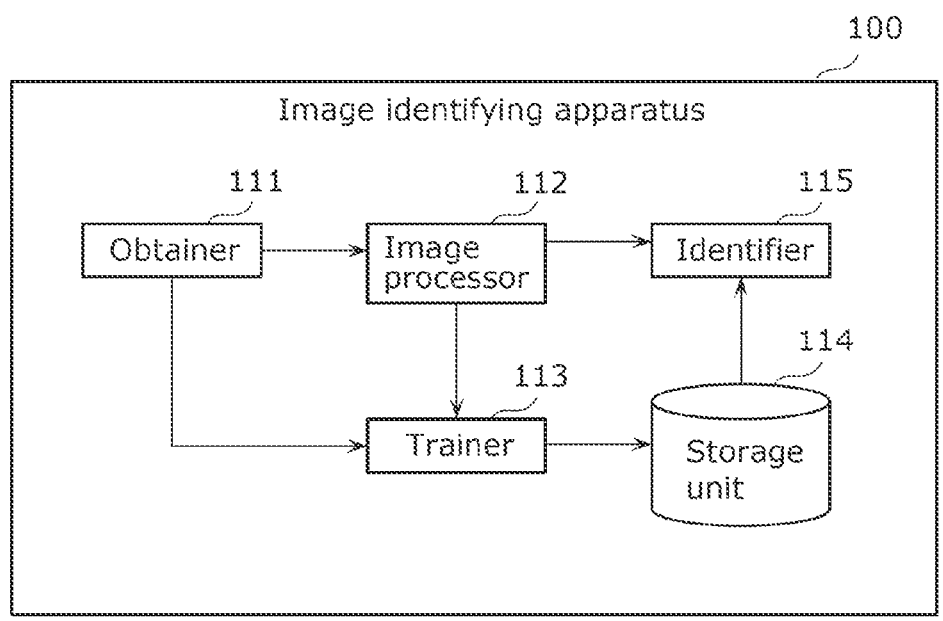
FIG. 3 is a block diagram illustrating an example of a functional configuration of the image identifying apparatus according to Embodiment 1.

FIG. 3 is a block diagram illustrating an example of a functional configuration of the image identifying apparatus according to Embodiment 1.

As shown in FIG. 3, image identifying apparatus 100 includes obtainer 111, image processor 112, trainer 113, storage unit 114, and identifier 115. Note that image identifying apparatus 100 may include no trainer 113.

Obtainer 111 obtains image data. Obtainer 111 may obtain the image data from an external apparatus via communication IF 104 or may obtain the image data from a camera via communication IF 104. Note that obtainer 111 may obtain still image data or moving image data as the image data.

Moreover, obtainer 111 may further obtain attribute information preliminarily associated with the obtained image data as correct answer data. Note that obtainer 111 obtains the image data associated with that attribute information as image data used for training (hereinafter, referred to as first training image data). Alternatively, obtainer 111 may obtain image data with which no attribute information is associated as image data used for identification. Instead of obtaining the attribute information preliminarily associated with the image data as the correct answer data, obtainer 111 may accept an input regarding the image data from a user and obtain attribute information based on the accepted input as the attribute information associated with the image data. Note that the first training image data is used for processing in trainer 113. The image data used for identification is used for processing in identifier 115.

Obtainer 111 is implemented, for example, by processor 101 executing a program stored in storage 103 to control operations of communication IF 104.

Image processor 112 generates second training image data or test image data by performing image processing on the image data obtained by obtainer 111. Specifically, image processor 112 generates the second training image data or the test image data by performing resizing to reduce the image data obtained by obtainer 111 with predetermined aspect ratio distortion. Specifically, image processor 112 reduces, as the resizing, image data having a fixed aspect ratio (horizontal side:vertical side) of A:B to image data having a fixed aspect ratio of C:D. Note that each of A, B, C, and D is a number greater than 0. Image processor 112 performs resizing to reduce each of the vertical side and the horizontal side at a fixed ratio, for example.

For example, A:B in the resizing described above may be 16:9, and C:D may be 1:1. Moreover, the image data having the aspect ratio of A:B may be, for example, image data having a size of 1920×1080 pixels, and the image data having the aspect ratio of C:D may be image data having a size of 224×224 pixels. That is, image processor 112 may perform, as the resizing, a conversion to reduce the image data from the size of 1920×1080 pixels to the size of 224×224 pixels, for example.

As just described, the image data used for identification may be the image data having the size of 1920×1080 pixels. Moreover, the test image data generated by image processor 112 may be the image data having the single size of 224×224 pixels.

Note that image processor 112 may perform resizing different from the resizing described above when generating the second training image data. Items of first training image data may include not only an image having an aspect ratio of 16:9 but also image data having various other aspect ratios. That is, the items of first training image data may include image data items of various sizes. However, if a ratio between a vertical length conversion rate (reduction rate) and a horizontal length conversion rate (reduction rate) in resizing differs between at the time of training and at the time of identification, the identification accuracy may deteriorate. Thus, image processor 112 at the time of the training also performs resizing on image data having various aspect ratios at a ratio equal to the ratio between the vertical length conversion rate and the horizontal length conversion rate in the resizing at the time of the identification.

Moreover, image processor 112 may generate the second training image data by further performing data augmentation, and normalization or standardization on the first training image data in addition to the resizing described above. Furthermore, image processor 112 may generate the test image data by, for example, further performing normalization or standardization on the image data used for identification in addition to the resizing described above.

The data augmentation refers to subjecting image data to processes such as translation, enlargement, reduction, rotation, and noise addition and is a process of increasing the number of training image data. That is, the number of training image data can be increased by a factor of N as a result of N types of data augmentation being performed on data of a single image. The items of second training image data generated through such data augmentation may include image data to which only the predetermined aspect ratio distortion due to the resizing has been applied, and data to which a type of aspect ratio distortion different from the resizing has been applied.

Moreover, the normalization may be, for example, an operation to convert a plurality of pixel values for a plurality of pixels constituting image data so that a maximum value of the plurality of pixel values becomes equal to 1 and a minimum value of the plurality of pixel values becomes equal to 0. Alternatively, the normalization may be, for example, an operation to convert a plurality of pixel values for a plurality of pixels constituting image data so that a maximum value of the plurality of pixel values becomes equal to N and a minimum value of the plurality of pixel values becomes equal to M.

Furthermore, the standardization may be an operation to convert a plurality of pixel values for a plurality of pixels constituting image data so that an average value of the plurality of pixel values becomes equal to 0 and a standard deviation thereof becomes equal to 1.

Note that image processor 112 generates the second training image data or the test image data without performing clipping (cropping) on an image of a main region of the image data in the resizing, data augmentation, and normalization described above. The image of the main region of the image data is, for example, an image having a pixel value greater than a predetermined value. The predetermined value is, for example, a value that falls within a range of 0 to 5% of the maximum pixel value. That is, image processor 112 performs no clipping on an image having a pixel value greater than the predetermined value.

Moreover, image processor 112 may generate the test image data by performing mask processing on a region including a character in the obtained image data, and then resizing the image data that has been subjected to the mask processing. This can improve the identification accuracy even when the image data includes such a character.

Furthermore, if the obtained image data includes letterbox information, image processor 112 may generate the test image data by erasing the letterbox information, and then resizing the image data that has been subjected to the erasing of the letterbox information. This can improve the identification accuracy even when the letterbox information is included. Note that the letterbox information refers to regions of black bands located above and below the image of the main region. That is, the letterbox information is a set of black pixels or pixels close to black, i.e., a set of pixels having pixel values smaller than or equal to the predetermined value.

Image processor 112 is implemented, for example, by processor 101 executing a program stored in storage 103.

Trainer 113 performs machine learning using a training data set that includes items of second training image data generated by image processor 112 and items of attribute information associated with the items of second training image data as items of correct answer data. Note that each of the items of attribute information that are associated with the items of second training image data as the items of correct answer data is attribute information associated, as correct answer data, with first training image data that is a source of conversion for the corresponding second training image data. Trainer 113 generates a machine learning model used for identifying the attribute information of the image data through the machine learning. Such a machine learning model includes trained parameters that have been adjusted through the machine learning. The generated machine learning model is stored in storage unit 114. Trainer 113 is implemented, for example, by processor 101 executing a program stored in storage 103.

Storage unit 114 stores machine learning models. Storage unit 114 may update a stored machine learning model to the machine learning model generated by trainer 113. Moreover, storage unit 114 may temporarily store the image data obtained by obtainer 111. Furthermore, storage unit 114 may temporarily store the training image data and the test image data generated by image processor 112. Storage unit 114 is implemented, for example, by storage 103.

Identifier 115 identifies the attribute information of the test image data generated by image processor 112, using the machine learning model stored in storage unit 114.

[1-2. Operations]

Operations of image identifying apparatus 100 will be described next.

Figure 4:
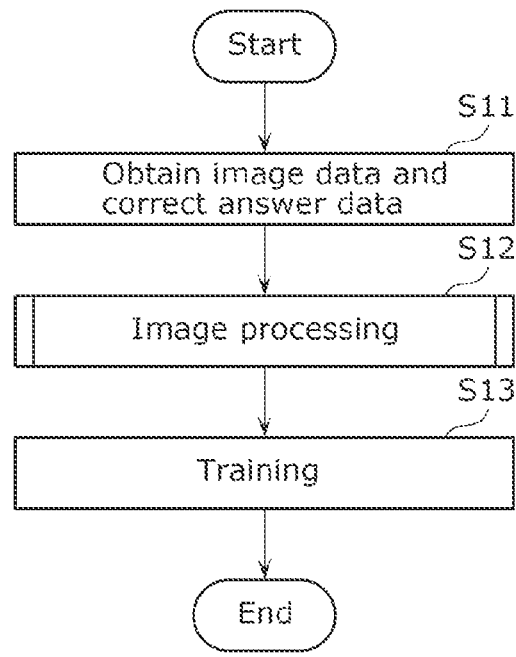
FIG. 4 is a flowchart illustrating an example of a training method using the image identifying apparatus according to Embodiment 1.

FIG. 4 is a flowchart illustrating an example of a training method using the image identifying apparatus according to Embodiment 1.

Image identifying apparatus 100 obtains image data and attribute information preliminarily associated with the image data as correct answer data (S11). Image identifying apparatus 100 obtains items of image data and attribute information associated with each of the items of image data as correct answer data.

Next, image identifying apparatus 100 executes image processing on the obtained image data (S12). Details of the image processing will be described later.

Next, image identifying apparatus 100 performs machine learning using a training data set including image data after the image processing and the correct answer data associated with the image data before the image processing (S13). Image identifying apparatus 100 thereby generates a machine learning model including adjusted trained parameters and stores the generated machine learning model in storage unit 114.

Figure 5:
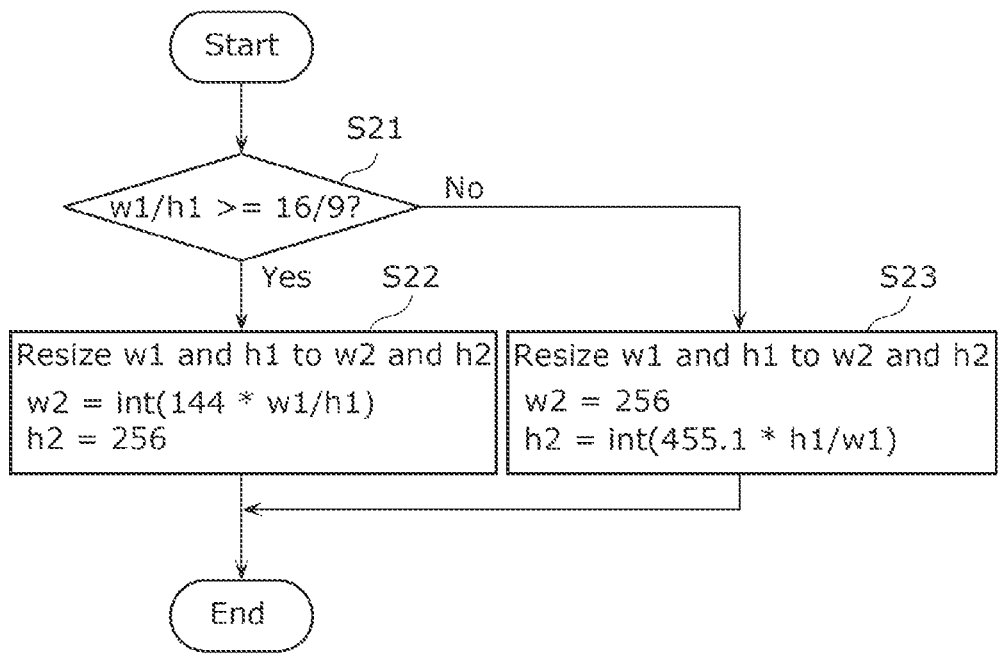
FIG. 5 is a flowchart illustrating an example of image processing in the training method using the image identifying apparatus according to Embodiment 1.
Figure 6:
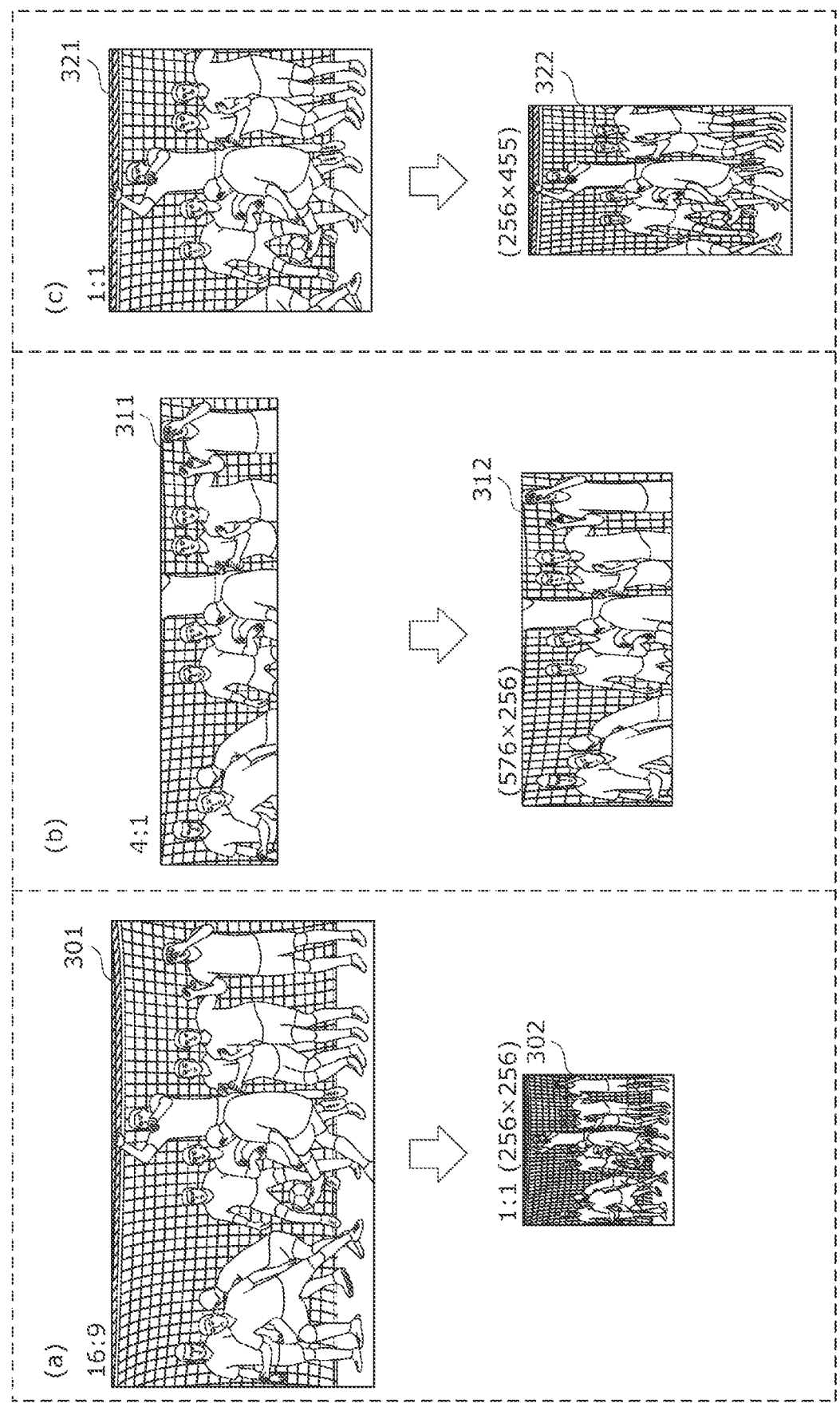
FIG. 6 is a diagram illustrating an example of image data before resizing in the training method and image data after the resizing.

FIG. 5 is a flowchart illustrating an example of the image processing in the training method using the image identifying apparatus according to Embodiment 1. The flowchart of FIG. 5 shows an example of resizing in the image processing. FIG. 6 is a diagram illustrating an example of image data before the resizing in the training method and image data after the resizing.

Image identifying apparatus 100 determines whether an aspect ratio value w1/h1 of image data to be resized is 16/9 or more (S21). Here, w1 denotes a horizontal length of the image data, and h1 denotes a vertical length of the image data. Moreover, the horizontal length of the image data refers to the number of pixels arranged in the horizontal direction, and the vertical length of the image data refers to the number of pixels arranged in the vertical direction. In step S21, it is determined whether the image data has a ratio of the horizontal length to the vertical length that is equal to or larger than an aspect ratio of 16:9.

If the aspect ratio value w1/h1 of the image data to be resized is 16/9 or more (Yes in S21), image identifying apparatus 100 resizes the image data so that horizontal length w2 becomes equal to 144*w1/h1 and vertical length h2 becomes equal to 256 (S22). As shown in (a) of FIG. 6, for example, image data 301 having an aspect ratio value of 16/9 is resized to generate image data 302 having an aspect ratio value of 1/1 and a size of 256×256. Image data 301 is an image in which at least the vertical length thereof is greater than 256. Moreover, as shown in (b) of FIG. 6, for example, image data 311 having an aspect ratio value of 4/1 is resized to generate image data 312 having a size of 576×256. Image data 311 is an image in which at least the vertical size thereof is greater than 256. As shown in (b) of FIG. 6, if the image data has a ratio of the horizontal length to the vertical length larger than the aspect ratio of 16:9, the vertical length is converted to be a fixed value of 256, and the horizontal length is converted to be equal to a ratio between a vertical length conversion rate and a horizontal length conversion rate when converting 16:9 to 1:1.

If the aspect ratio value w1/h1 of the image data to be resized is smaller than 16/9 (No in S21), image identifying apparatus 100 resizes the image data so that horizontal length w2 becomes equal to 256 and vertical length h2 becomes equal to 455.1*h1/w1 (S23). For example, as shown in (c) of FIG. 6, image data 321 having an aspect ratio value of 1/1 is resized to generate image data 322 having a size of 256×455. Image data 321 is an image in which at least the horizontal length thereof is greater than 256. As shown in (c) of FIG. 6, if the image data has a ratio of the vertical length to the horizontal length larger than the aspect ratio of 16:9, the horizontal length is converted to be a fixed value of 256, and the horizontal length is converted to be equal to the ratio between the vertical length conversion rate and the horizontal length conversion rate when converting 16:9 to 1:1.

As just described, image identifying apparatus 100 converts a shorter length to be 256 and a longer length to be equal to the ratio between the vertical length conversion rate and the horizontal length conversion rate when converting 16:9 to 1:1. Note that image identifying apparatus 100 may convert a shorter length to a length other than 256 without limiting the target value of the shorter length to 256.

Figure 7:
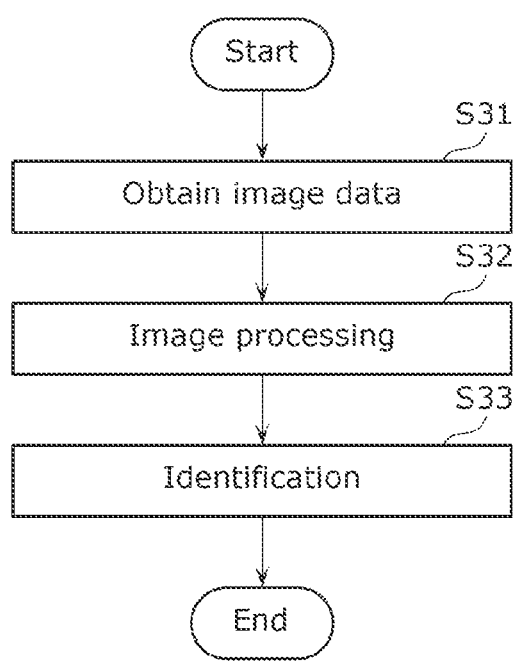
FIG. 7 is a flowchart illustrating an example of an image identifying method using the image identifying apparatus according to Embodiment 1.
Figure 8:
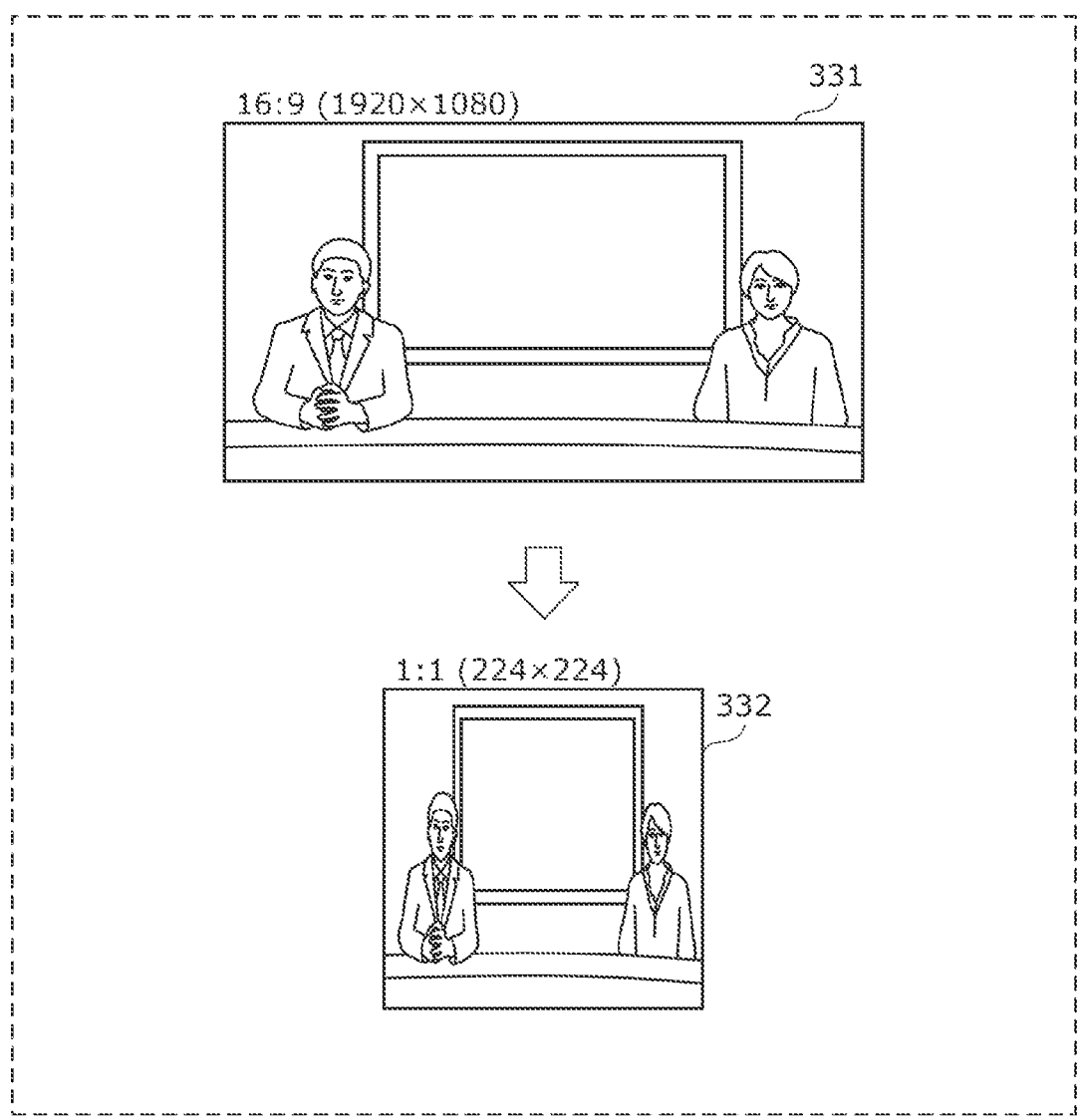
FIG. 8 is a diagram illustrating an example of image data before resizing in the image identifying method according to Embodiment 1 and image data after the resizing.

FIG. 7 is a flowchart illustrating an example of an image identifying method using the image identifying apparatus according to Embodiment 1. FIG. 8 is a diagram illustrating an example of image data before resizing in the image identifying method and image data after the resizing.

Image identifying apparatus 100 obtains image data (S31).

Next, image identifying apparatus 100 executes image processing on the obtained image data (S32). Specifically, as shown in FIG. 8, image identifying apparatus 100 generates image data 332 having an aspect ratio of 1:1 and a size of 224×224 by resizing image data 331 having an aspect ratio of 16:9 and a size of 1920×1080.

Next, image identifying apparatus 100 identifies attribute information of the test image data generated by image processor 112 using a machine learning model stored in storage unit 114 (S33).

As will be described later, the identified attribute information may be used to set an image quality adjustment parameter in reproducing a moving image of video data and to set an audio quality adjustment parameter in reproducing audio data. Moreover, the identified attribute information may be used to classify the image data. For example, such identified attribute information may be used to classify image data captured by a camera by genre. Furthermore, image identifying apparatus 100 may be mounted on the camera, and the identified attribute information may be used to set a shooting parameter of the camera.

[1-3. Effects and the Like]

According to image identifying apparatus 100 of the present embodiment, the machine learning model includes the trained parameters that have been adjusted through the machine learning of the training data set including: the items of second training image data obtained through the application of the one or more types of aspect ratio distortion including the aspect ratio distortion to be applied in the resizing to generate the test image data; and the items of attribute information associated with the items of second training image data. This enables the machine learning model to effectively identify the attribute information of the entire test image data. Moreover, since the test image is generated through the resizing, processing load related to such identification processing can be reduced.

Furthermore, in image identifying apparatus 100 according to the present embodiment, image processor 112 generates the test image data without performing clipping on the image of the main region of the image data. According to this, since a part of the image of the main region is not eliminated, the attribute information of the entire image of the main region can be identified with high accuracy.

Embodiment 2

[2-1. Configuration]

Figure 9:
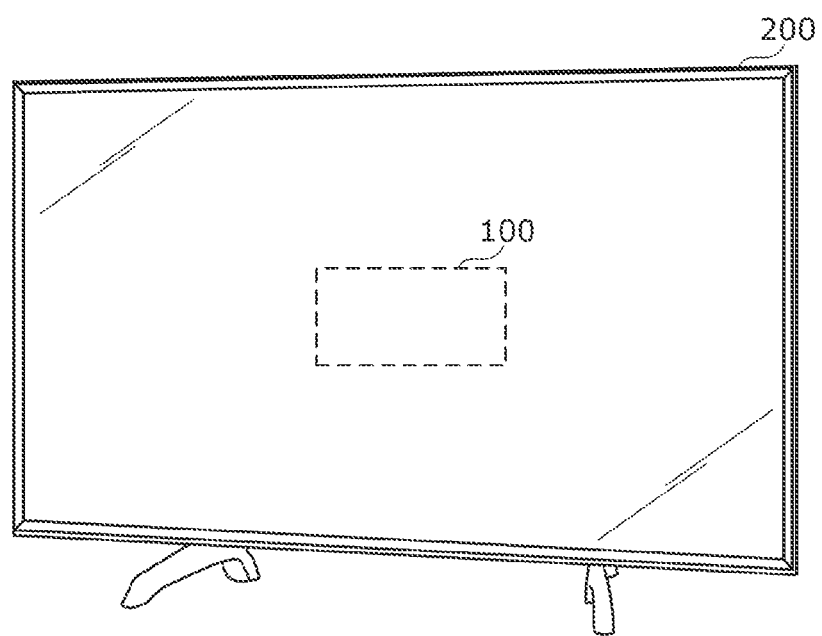
FIG. 9 is a diagram illustrating an example of a video reproducing apparatus according to Embodiment 2.

FIG. 9 is a diagram illustrating an example of a video reproducing apparatus according to Embodiment 2.

As shown in FIG. 9, video reproducing apparatus 200 includes image identifying apparatus 100 described in Embodiment 1 and executes a process for reproducing video data using an identification result of moving image data included in the video data, which is obtained by image identifying apparatus 100. Note that the video data includes items of image data (i.e., a plurality of frames) as the moving image data, and audio data. Video reproducing apparatus 200 performs an optimal image quality adjustment and an optimal audio quality adjustment on the video data, using attribute information, and then reproduces the video data.

Figure 10:
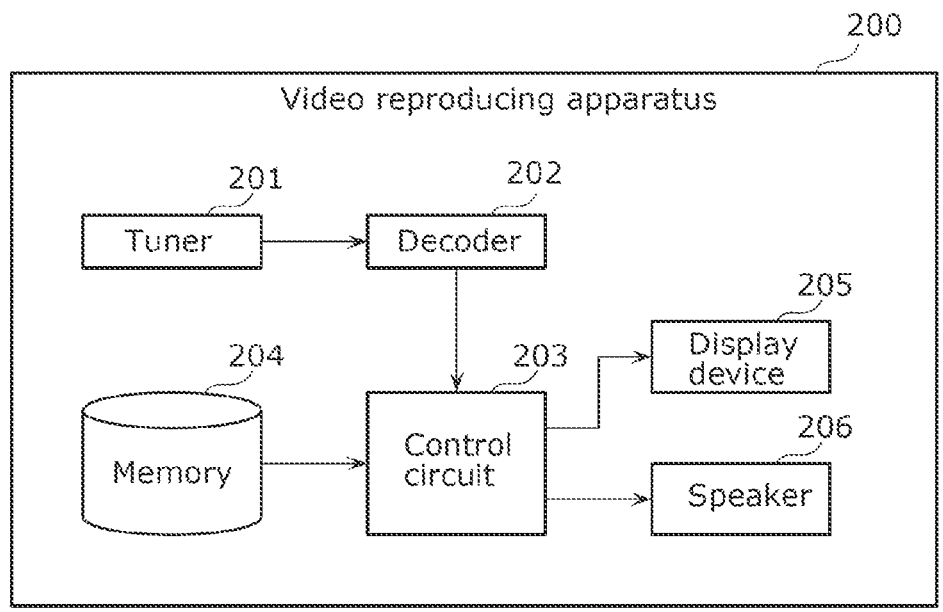
FIG. 10 is a block diagram illustrating an example of a hardware configuration of the video reproducing apparatus according to Embodiment 2.

FIG. 10 is a block diagram illustrating an example of a hardware configuration of the video reproducing apparatus according to Embodiment 2.

As shown in FIG. 10, video reproducing apparatus 200 includes tuner 201, decoder 202, control circuit 203, memory 204, display device 205, and speaker 206. Video reproducing apparatus 200 is, for example, a television set.

Tuner 201 converts an analog signal constituting a broadcast wave received by an antenna (not shown) into encoded data, which is a digital signal, and outputs the encoded data obtained by such conversion to decoder 202.

Decoder 202 decodes the encoded data obtained from tuner 201 and outputs video data obtained by such decoding to control circuit 203. If the encoded data is multiplexed data, decoder 202 decodes encoded video data and encoded audio data, which are obtained by demultiplexing the encoded data, into video data and audio data, respectively.

Control circuit 203 performs video processing on the video data outputted by decoder 202. Control circuit 203 outputs video obtained through the video processing to display device 205. Note that decoder 202 and control circuit 203 may be implemented in the same circuit. Control circuit 203 may also be implemented by a general-purpose processor such as a CPU that executes a predetermined program or may be implemented by a dedicated circuit. That is, functions of video reproducing apparatus 200 to be described later may be implemented by software or hardware.

Memory 204 may store a control program. Memory 204 is, for example, a non-volatile memory.

Display device 205 displays the video outputted by control circuit 203. Display device 205 is a display panel and may be, for example, a liquid crystal panel, an organic EL panel, or the like.

Speaker 206 outputs audio outputted by control circuit 203.

Note that video reproducing apparatus 200 may include no display device 205 and no speaker 206. That is, video reproducing apparatus 200 is not limited to a television set if the apparatus can output video to an externally connected display device and output audio to an externally connected speaker. Video reproducing apparatus 200 may be implemented by a recorder, a set-top box, or the like or may be implemented by an information processing apparatus such as a personal computer (PC), a smartphone, or a tablet terminal.

Figure 11:
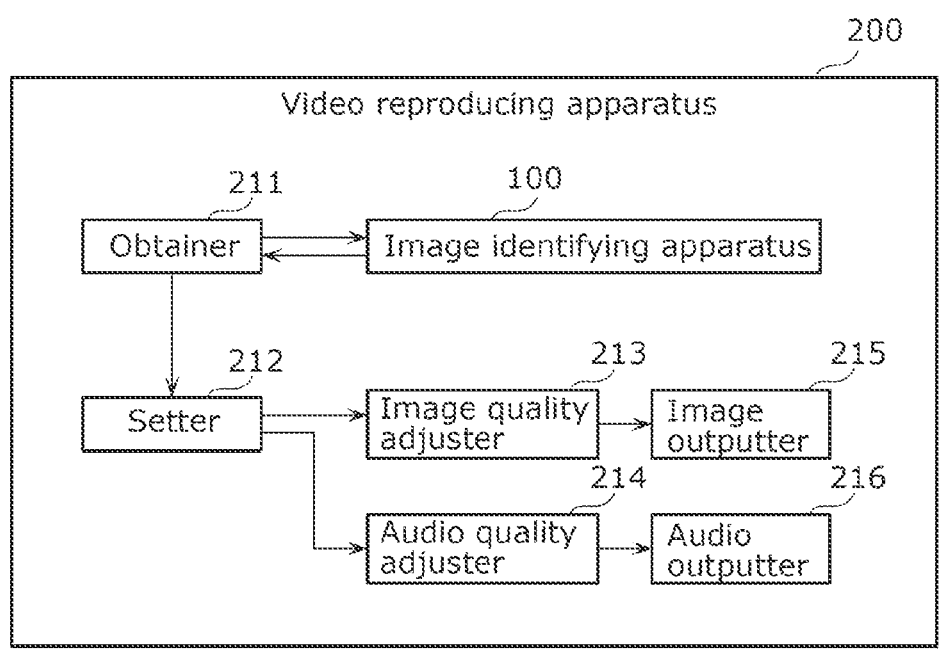
FIG. 11 is a block diagram illustrating an example of a functional configuration of the video reproducing apparatus according to Embodiment 2.

FIG. 11 is a block diagram illustrating an example of a functional configuration of the video reproducing apparatus according to Embodiment 2.

As shown in FIG. 11, video reproducing apparatus 200 includes obtainer 211, setter 212, image quality adjuster 213, audio quality adjuster 214, image outputter 215, audio outputter 216, and image identifying apparatus 100.

Obtainer 211 obtains video data. Obtainer 211 obtains the video data, for example, by decoding the encoded data obtained from tuner 201 using decoder 202. Obtainer 211 outputs the obtained video data to image identifying apparatus 100 and obtains, from image identifying apparatus 100, attribute information as an identification result of moving image data, i.e., each of items of image data, included in the video data. Note that the attribute information outputted from image identifying apparatus 100 is about a genre of the moving image data, for example. Examples of such a genre are sports, music, talks, and movies. Obtainer 211 is implemented, for example, by tuner 201 and decoder 202.

Setter 212 sets an image quality adjustment parameter used for image quality adjustment processing and an audio quality adjustment parameter used for audio quality adjustment processing, based on the attribute information identified in each of the items of image data. Based on the attribute information, for example, setter 212 sets the image quality adjustment parameter to be optimal for moving images in the moving image data genre specified by the attribute information and sets the audio quality adjustment parameter to be optimal for audio in that moving image data genre. For example, memory 204 stores parameter information in which a type of attribute information, an image quality adjustment parameter optimal for the type of attribute information, and an audio quality adjustment parameter optimal for the type of attribute information are preliminarily associated with one another. Setter 212 refers to the parameter information and sets the image quality adjustment parameter and the audio quality adjustment parameter associated with the identified attribute information in the parameter information.

Moreover, setter 212 sequentially sets the image quality adjustment parameter and the audio quality adjustment parameter based on attribute information of image data obtained at a predetermined time interval. Thus, an image quality adjustment and an audio quality adjustment suitable for characteristics of image data and audio data can be performed at the predetermined time interval. That is, even when a scene of the video data is changed and its moving image genre is changed accordingly, setter 212 can set the image quality adjustment parameter and the audio quality adjustment parameter to be optimal for the changed moving image genre.

Alternatively, setter 212 may set the image quality adjustment parameter and the audio quality adjustment parameter based on a type of attribute information that is most common among items of attribute information obtained in a predetermined period up to the present time. According to this, even when image data that is more likely to be falsely recognized is included among the items of image data, the image quality adjustment parameter and the audio quality adjustment parameter are set based on the type of attribute information most often identified. Thus, the possibility that the image quality adjustment parameter and the audio quality adjustment parameter are momentarily switched to those corresponding to a type of attribute information given by the false recognition can be reduced.

Setter 212 is implemented, for example, by control circuit 203 executing a program stored in memory 204.

Image quality adjuster 213 performs an image quality adjustment on the image data according to the image quality adjustment parameter set by setter 212. Image quality adjuster 213 adjusts, for example, brightness, contrast, sharpness, frame interpolation, and the like of the image. Image quality adjuster 213 is implemented, for example, by control circuit 203 executing a program stored in memory 204.

Audio quality adjuster 214 performs an audio quality adjustment of the audio data according to the audio quality adjustment parameter set by setter 212. Audio quality adjuster 214 adjusts, for example, midrange, deep bass, surround sound, and the like of the audio. Audio quality adjuster 214 is implemented, for example, by control circuit 203 executing a program stored in memory 204.

Image outputter 215 outputs the image data that has been subjected to the image quality adjustment by image quality adjuster 213. Image outputter 215 causes display device 205 to display the image data that has been subjected to the image quality adjustment by image quality adjuster 213, for example. Image outputter 215 is implemented, for example, by control circuit 203 executing a program stored in memory 204 to control operations of display device 205.

Audio outputter 216 outputs the audio data that has been subjected to the audio quality adjustment by audio quality adjuster 214. Audio outputter 216 causes speaker 206 to output the audio data that has been subjected to the audio quality adjustment by audio quality adjuster 214, for example. Audio outputter 216 is implemented, for example, by control circuit 203 executing a program stored in memory 204 to control operations of speaker 206.

Note that a functional configuration of image identifying apparatus 100 is the same as that in Embodiment 1, and the description thereof will be thus omitted. Functions of image identifying apparatus 100 are implemented by control circuit 203 and memory 204.

[2-2. Operations]

Operations of video reproducing apparatus 200 will be described next.

Figure 12:
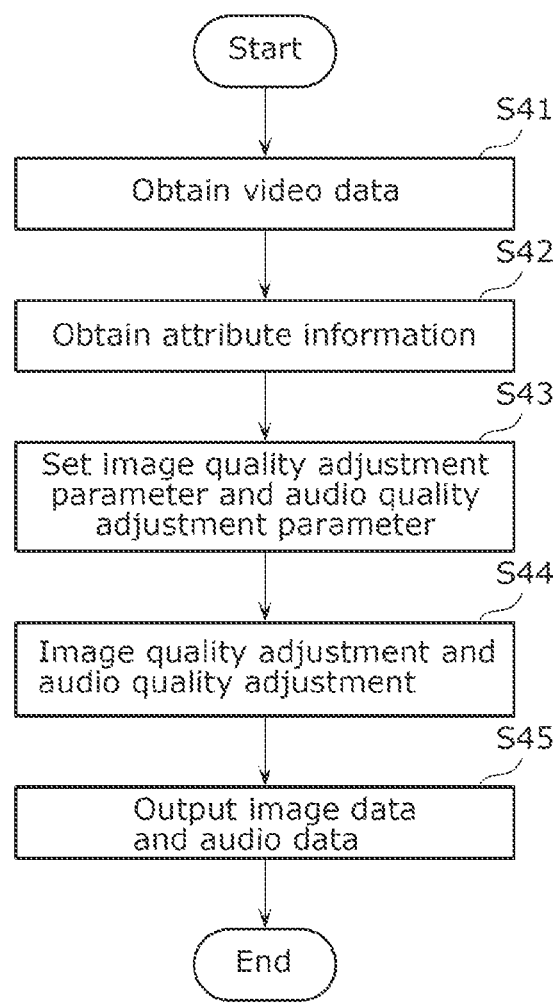
FIG. 12 is a flowchart illustrating an example of a video reproducing method using the video reproducing apparatus according to Embodiment 2.

FIG. 12 is a flowchart illustrating an example of a video reproducing method using the video reproducing apparatus according to Embodiment 2.

Video reproducing apparatus 200 obtains video data (S41).

Next, video reproducing apparatus 200 obtains, from image identifying apparatus 100, attribute information as an identification result of moving image data, i.e., each of items of image data, included in the video data (S42).

Next, video reproducing apparatus 200 sets an image quality adjustment parameter used for image quality adjustment processing and an audio quality adjustment parameter used for audio quality adjustment processing, based on the attribute information identified in each of the items of image data (S43).

Next, video reproducing apparatus 200 performs an image quality adjustment on the image data according to the image quality adjustment parameter set by setter 212 and performs an audio quality adjustment on audio data according to the audio quality adjustment parameter set by setter 212 (S44).

Next, video reproducing apparatus 200 outputs the image data that has been subjected to the image quality adjustment by image quality adjuster 213 and the audio data that has been subjected to the audio quality adjustment by audio quality adjuster 214 (S45).

[2-3. Effects and the Like]

According to video reproducing apparatus 200 of the present embodiment, the image quality adjustment and the audio quality adjustment can be performed based on the attribute information identified from the obtained image data. Thus, the image quality adjustment and the audio quality adjustment can be performed suitably for characteristics of the image data and the audio data.

[2-4. Variations]

In the above embodiment, video reproducing apparatus 200 is configured to include image identifying apparatus 100. However, without being limited to such a configuration, image identifying apparatus 100 may be an apparatus external to video reproducing apparatus 200. That is, video reproducing apparatus 200 may sequentially obtain attribute information for each of items of image data in video data from image identifying apparatus 100 connected via a communication IF.

In the above embodiment, video reproducing apparatus 200 is configured to include tuner 201, and obtainer 211 is implemented by tuner 201 and decoder 202. However, video reproducing apparatus 200 is not limited thereto. Obtainer 211 may obtain video data by reading the video data recorded on a recording medium (predetermined package medium) such as an optical disc. In this case, obtainer 211 may be implemented by an electrical device equipped with an optical pickup for reading such an optical disc. Moreover, obtainer 211 may obtain video data from an external server via a network such as the Internet. In this case, obtainer 211 may be implemented by a communication IF for communicating with the external server.

In the above embodiment, the attribute information is described as a genre of image data. However, without being limited thereto, the attribute information may be identification information that identifies a classification of an image quality adjustment parameter optimal for an image quality adjustment of the image data. That is, as long as the identification information that identifies the classification of the image quality adjustment parameter is associated with the attribute information, video reproducing apparatus 200 can set the image quality adjustment parameter optimal for that image data based on the identification information even at a time when the genre of the image data is not necessarily associated with the attribute information. Note that the same applies also to an audio quality adjustment parameter for audio data.

Moreover, in the above embodiments, each component may be configured as dedicated hardware or may be implemented by execution of a software program suitable for each component. Each component may be implemented by a program executor, such as a CPU or a processor, reading and executing a software program recorded on a recording medium such as a hard disk or a semiconductor memory.

Furthermore, each component may be a circuit (or an integrated circuit). These circuits may constitute one circuit as a whole or may be separate circuits. Furthermore, these circuits may each be a general-purpose circuit or a dedicated circuit.

Furthermore, a general or specific aspect of the present disclosure may be implemented by a system, an apparatus, a method, an integrated circuit, a computer program, or a computer-readable non-transitory recording medium such as a CD-ROM. Alternatively, a general or specific aspect of the present disclosure may be implemented by any combination of a system, an apparatus, a method, an integrated circuit, a computer program, and a computer-readable non-transitory recording medium.

For example, the present disclosure may be implemented as an image identifying method to be executed by an image identifying apparatus (a computer or a DSP) or implemented as a program for causing a computer or a DSP to execute the image identifying method. For example, the present disclosure may also be implemented as a video reproducing method to be executed by a video reproducing apparatus (a computer or a DSP) or may be implemented as a program for causing a computer or a DSP to execute the video reproducing method.

Furthermore, in the above embodiments, other processors may execute the processes described to be executed by the particular processors. Furthermore, the order of the plurality of processes in the operations of the image identifying apparatus or the operations of the video reproducing apparatus described in the above embodiments may be changed, or the plurality of processes may be executed in parallel.

In addition, the present disclosure also encompasses modes obtained by making various variations conceivable by those skilled in the art with respect to the embodiments, or modes implemented by any combinations of the components and the functions in the embodiments without departing from the spirit of the present disclosure.

INDUSTRIAL APPLICABILITY

The present disclosure is useful, for example, as an image identifying apparatus, a video reproducing apparatus, an image identifying method, and a program that can effectively identify attribute information of an image.

REFERENCE SIGNS LIST

100 Image identifying apparatus
101 Processor
102 Main memory
103 Storage
104 Communication IF
105 Input IF
106 Display
111 Obtainer
112 Image processor
113 Trainer
114 Storage unit
115 Identifier
200 Video reproducing apparatus 201 Tuner
202 Decoder
203 Control circuit
204 Memory
205 Display device
206 Speaker
211 Obtainer
212 Setter
213 Image quality adjuster
214 Audio quality adjuster
215 Image outputter
216 Audio outputter
301, 302, 311, 312, 321, 322, 331, 332 Image data

The invention claimed is:

1. An image identifying apparatus comprising:
an obtainer that obtains image data;
an image processor that generates test image data by performing resizing to reduce the image data with predetermined aspect ratio distortion;
a storage unit that stores a machine learning model used to identify attribute information of the test image data; and
an identifier that identifies the attribute information of the test image data, using the machine learning model,
wherein the machine learning model includes trained parameters that have been adjusted through machine learning using a training data set including items of second training image data obtained through application of one or more types of aspect ratio distortion including the predetermined aspect ratio distortion to each of items of first training image data, and items of attribute information associated with the items of second training image data, and
the image processor:
(i) generates the test image data by performing mask processing on a region including a character in the image data obtained, and then performing the resizing on the image data that has been subjected to the mask processing, or
(ii) if the image data obtained includes letterbox information, generates the test image data by erasing the letterbox information, and then performing the resizing on the image data that has been subjected to the erasing of the letterbox information.

2. The image identifying apparatus according to claim 1, wherein the image processor generates the test image data without performing clipping on an image of a main region of the image data.

3. A video reproducing apparatus comprising:
an obtainer that obtains video data including items of image data and audio data and obtains, from an image identifying apparatus, attribute information as an identification result of each of the items of image data included in the video data;
a setter that sets an image quality adjustment parameter used for image quality adjustment processing and sets an audio quality adjustment parameter used for audio quality adjustment processing, based on the attribute information identified in each of the items of image data;
an image quality adjuster that performs an image quality adjustment on the image data according to the image quality adjustment parameter set by the setter;
an audio quality adjuster that performs an audio quality adjustment on the audio data according to the audio quality adjustment parameter set by the setter;
an image outputter that outputs the image data that has been subjected to the image quality adjustment; and
an audio outputter that outputs the audio data that has been subjected to the audio quality adjustment,
wherein the image identifying apparatus includes:
an image obtainer that obtains image data;
an image processor that generates test image data by performing resizing to reduce the image data with predetermined aspect ratio distortion;
a storage unit that stores a machine learning model used to identify attribute information of the test image data; and
an identifier that identifies the attribute information of the test image data, using the machine learning model, and
the machine learning model includes trained parameters that have been adjusted through machine learning using a training data set including items of second training image data obtained through application of one or more types of aspect ratio distortion including the predetermined aspect ratio distortion to each of items of first training image data, and items of attribute information associated with the items of second training image data.

4. The video reproducing apparatus according to claim 3, wherein the setter sets the image quality adjustment parameter and the audio quality adjustment parameter based on attribute information obtained at a predetermined time interval.

5. The video reproducing apparatus according to claim 3, wherein the setter sets the image quality adjustment parameter and the audio quality adjustment parameter based on a type of attribute information that is most common among items of attribute information obtained in a predetermined period up to a present time.

6. The video reproducing apparatus according to claim 3, wherein the image processor generates the test image data by performing mask processing on a region including a character in the image data obtained, and then performing the resizing on the image data that has been subjected to the mask processing.

7. The video reproducing apparatus according to claim 3, wherein, if the image data obtained includes letterbox information, the image processor generates the test image data by erasing the letterbox information, and then performing the resizing on the image data that has been subjected to the erasing of the letterbox information.

8. The video reproducing apparatus according to claim 3, wherein the image processor generates the test image data without performing clipping on an image of a main region of the image data.

9. An image identifying method comprising:
obtaining image data;
performing image processing to generate test image data through resizing to reduce the image data with predetermined aspect ratio distortion; and
identifying, using a machine learning model used to identify attribute information of the test image data, the attribute information of the test image data,
wherein the machine learning model includes trained parameters that have been adjusted through machine learning of a training data set including items of second training image data obtained through application of one or more types of aspect ratio distortion including the predetermined aspect ratio distortion to each of items of first training image data, and items of attribute information associated with the items of second training image data, and the performing the image processing includes:
- (i) generating the test image data by performing mask processing on a region including a character in the image data obtained, and then performing the resizing on the image data that has been subjected to the mask processing, or
- (ii) if the image data obtained includes letterbox information, generating the test image data by erasing the letterbox information, and then performing the resizing on the image data that has been subjected to the erasing of the letterbox information.

10. A computer-readable non-transitory recording medium having stored thereon a computer program for causing a computer to execute the image identifying method according to claim 9.

* * * * *